(12) United States Patent
Ahmadian et al.

(10) Patent No.: US 10,202,903 B2
(45) Date of Patent: Feb. 12, 2019

(54) APPARATUS AND METHOD FOR AIR PARTICLE SEPARATION IN A GAS TURBINE ENGINE

(71) Applicant: United Technologies Corporation, Farmington, CT (US)

(72) Inventors: Shayan Ahmadian, Vernon, CT (US); Steven Bruce Gautschi, Naugatuck, CT (US); Mark F. Zelesky, Bolton, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 308 days.

(21) Appl. No.: 14/861,601

(22) Filed: Sep. 22, 2015

(65) Prior Publication Data

US 2017/0082025 A1    Mar. 23, 2017

(51) Int. Cl.
| | |
|---|---|
| *F02C 7/052* | (2006.01) |
| *F02C 7/05* | (2006.01) |
| *B01D 45/14* | (2006.01) |
| *F02C 3/04* | (2006.01) |

(52) U.S. Cl.
CPC ............. *F02C 7/052* (2013.01); *B01D 45/14* (2013.01); *F02C 3/04* (2013.01); *F02C 7/05* (2013.01); *F05D 2220/32* (2013.01); *F05D 2250/294* (2013.01)

(58) Field of Classification Search
CPC .... F02C 7/05; F02C 7/052; F02C 3/04; F05D 2220/32; F05D 2250/294; F05D 2260/607; B01D 45/14; B01D 33/0009; B01D 33/06; B01D 33/073; B01D 2033/07

See application file for complete search history.

(56) References Cited

U.S. PATENT DOCUMENTS

| | | | | |
|---|---|---|---|---|
| 2,328,220 | A | * | 8/1943 | Torvald ................ B01D 45/14 55/290 |
| 4,568,365 | A | * | 2/1986 | Metcalfe ............... B01D 45/08 55/290 |
| 4,797,128 | A | | 1/1989 | Fowler |
| 4,874,402 | A | | 10/1989 | Vogel |
| 5,163,565 | A | * | 11/1992 | Caskey ................ B07B 13/02 209/687 |

(Continued)

FOREIGN PATENT DOCUMENTS

| | | |
|---|---|---|
| EP | 0592737 A1 | 4/1994 |
| GB | 2443545 A | 5/2008 |

(Continued)

OTHER PUBLICATIONS

European Search Report and Written Opinion; International Application No. EP16189883; International Filing Date: Sep. 21, 2016; dated Feb. 16, 2017; 11 pages.

*Primary Examiner* — Andrew Nguyen
(74) *Attorney, Agent, or Firm* — Cantor Colburn LLP (57) ABSTRACT

A particle separator for removing particles in a flow of air is provided. The particle separator having: a conduit for directing air towards a curved section of the conduit; and a drum in fluid communication with the conduit proximate to the curved section of the conduit, wherein particles in the air travelling towards the curved section will contact a surface of the drum.

16 Claims, 4 Drawing Sheets
(2 of 4 Drawing Sheet(s) Filed in Color)

(56) References Cited

U.S. PATENT DOCUMENTS

| | | | |
|---|---|---|---|
| 5,165,236 A | | 11/1992 | Nieminen |
| 6,110,242 A | * | 8/2000 | Young .................... B01D 45/12 209/139.2 |
| 6,386,015 B1 | | 5/2002 | Rader et al. |
| 7,197,879 B2 | * | 4/2007 | Buehman .................. F02C 7/22 60/39.094 |
| 7,770,375 B2 | | 8/2010 | Alvanos et al. |
| 8,092,145 B2 | | 1/2012 | Martel et al. |
| 8,561,411 B2 | | 10/2013 | Dibenedetto |
| 2003/0024233 A1 | | 2/2003 | Snyder |
| 2007/0235373 A1 | * | 10/2007 | Strangman ............ F04D 29/441 209/580 |
| 2012/0285867 A1 | * | 11/2012 | Schmidt ................ B01D 33/46 208/390 |
| 2016/0045923 A1 | * | 2/2016 | Correia .................. F01D 5/081 55/392 |

FOREIGN PATENT DOCUMENTS

| | | |
|---|---|---|
| KR | 20110126354 A | 11/2011 |
| WO | 2013040678 A1 | 3/2013 |

* cited by examiner

APPARATUS AND METHOD FOR AIR PARTICLE SEPARATION IN A GAS TURBINE ENGINE

BACKGROUND

This disclosure relates to gas turbine engines, and more particularly to an apparatus and method for removing air particles and/or objects from a gas turbine engine.

Sand and/or other particles and/or objects entering or travelling thorough a gas turbine can reduce the life of parts in service by erosion and as well as thermos chemical-mechanical degradation (CMAS attack).

Accordingly, it is desirable to remove the particles and/or objects from the air/gas path of a gas turbine engine.

BRIEF DESCRIPTION

In one embodiment, a particle separator for removing particles in a flow of air is provided. The particle separator having: a conduit for directing air towards a curved section of the conduit; and a drum in fluid communication with the conduit proximate to the curved section of the conduit, wherein particles in the air travelling towards the curved section will contact a surface of the drum.

In addition to one or more of the features described above, or as an alternative to any of the foregoing embodiments, the surface of the drum may be provided with a plurality of grooves.

In addition to one or more of the features described above, or as an alternative to any of the foregoing embodiments, the surface of the drum may be provided with an adhesive layer to captivate the particles that contact the surface of the drum.

In addition to one or more of the features described above, or as an alternative to any of the foregoing embodiments, the surface of the drum may be provided with a solvent layer that dissolves particles that contact the surface of the drum.

In addition to one or more of the features described above, or as an alternative to any of the foregoing embodiments, the curved section may be located between an inlet section and an outlet section of the conduit.

In addition to one or more of the features described above, or as an alternative to any of the foregoing embodiments, the drum may be rotatably secured to the particle separator and wherein the particle separator further comprises a scraper configured and positioned to contact the surface of drum as it rotates due to the particles contacting the surface of the drum, wherein the scraper is configured to separate particles captured on the surface of the drum from the surface of the drum.

In addition to one or more of the features described above, or as an alternative to any of the foregoing embodiments, further embodiments may include a second conduit fluidly coupled to the surface of the drum, wherein particles separated from the surface of the drum by the scraper are deposited into the second conduit.

In addition to one or more of the features described above, or as an alternative to any of the foregoing embodiments, further embodiments may include a purge line fluidly coupled to conduit and the second conduit via a valve, wherein the second conduit is be periodically purged via actuation of the valve.

In addition to one or more of the features described above, or as an alternative to any of the foregoing embodiments, the valve may be an electronically controlled valve.

In addition to one or more of the features described above, or as an alternative to any of the foregoing embodiments, the conduit may have at least one opening providing fluid communication between the surface of the drum and the conduit and wherein the drum non-rotatably or fixedly secured to the particle separator.

In addition to one or more of the features described above, or as an alternative to any of the foregoing embodiments, the particle separator may be located in an engine and wherein the drum is rotatably secured to the particle separator.

In addition to one or more of the features described above, or as an alternative to any of the foregoing embodiments, the engine may be a gas turbine engine configured for use in an aircraft.

In addition to one or more of the features described above, or as an alternative to any of the foregoing embodiments, the curved section may be located between an inlet section and an outlet section of the conduit and wherein the particle separator further comprises at least one other particle separator fluidly coupled to the outlet section of the particle separator, wherein the at least one other particle separator comprises a conduit for directing air towards a curved section of the conduit of the at least one other particle separator; and a drum in fluid communication with the conduit of the at least one other particle separator proximate to the curved section of the conduit of the at least one other particle separator, wherein particles in the air travelling towards the curved section of the at least one other particle separator will contact a surface of the drum of the at least one other particle separator.

In addition to one or more of the features described above, or as an alternative to any of the foregoing embodiments, the particle separator may be configured to direct particles in a range of 1-100 μm towards the curved section such the particles will contact the surface of the drum.

In addition to one or more of the features described above, or as an alternative to any of the foregoing embodiments, the surface of the drum may be provided with a plurality of grooves and wherein the drum of the particle separator is rotatably secured to the particle separator and the drum of the at least one other particle separator is rotatably secured to the at least one other particle separator.

In yet another embodiment, an engine is provided. The engine having: an inlet opening for directing air towards a compressor of the engine; and a particle separator located between the compressor and a combustor of the engine such that air travelling towards the combustor from the compressor travels through the particle separator, wherein the particle separator comprises: a conduit for directing air towards a curved section of the conduit; and a drum in fluid communication with the conduit proximate to the curved section of the conduit, wherein particles in the air travelling towards the curved section will contact a surface of the drum.

In addition to one or more of the features described above, or as an alternative to any of the foregoing embodiments, the drum may be rotatably secured to the particle separator and wherein the particle separator further comprises a scraper configured and positioned to contact the surface of drum as it rotates due to the particles contacting the surface of the drum, wherein the scraper is configured to separate particles captured on the surface of the drum from the surface of the drum.

In addition to one or more of the features described above, or as an alternative to any of the foregoing embodiments, the engine may be a gas turbine engine configured for use in an aircraft and wherein particle separator is configured to direct particles in a range of 1-200 μm towards the curved section such the particles will contact the surface of the drum.

In yet another embodiment, a method for removing particles from an air flow path is provided. The method including the steps of: directing air from an inlet section of a conduit towards a curved section of the conduit; accelerating a velocity of particles in the air at the curved section; and receiving and retaining the particles on a surface of a drum proximate to the curved section.

In addition to one or more of the features described above, or as an alternative to any of the foregoing embodiments, the air flow path may be in an engine and wherein the drum is configured for rotational movement as it is contacted by the particles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to an apparatus and method for removing particles from a gas turbine engine and a gas turbine engine employing the apparatus and method for removing said particles.

As mentioned above, particles entering the gas turbine engine can reduce the life of parts in service by erosion and as well as thermos-chemical-mechanical degradation. Therefore it is of interest to remove the particles and/or objects from the air/gas path. Ideally, separating particles and/or objects would be done without reduction in pressure and loss of performance and efficiency.

Figure 1:
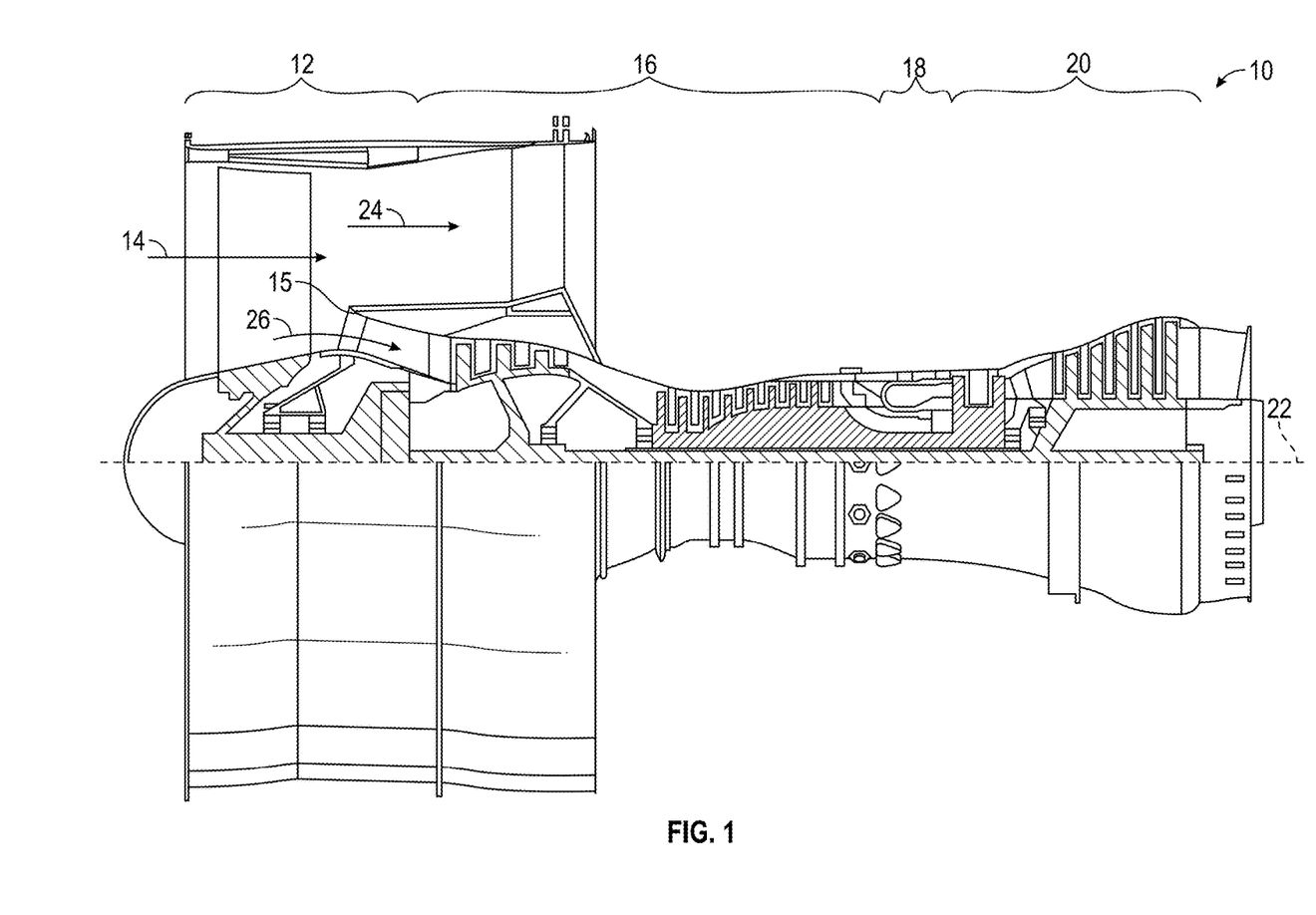
FIG. 1 is a partial cross-sectional schematic illustration of a gas turbine engine.

FIG. 1 is a partial cross-sectional schematic illustration of a gas turbine engine or engine 10. Although, a specific gas turbine engine is illustrated in FIG. 1 various embodiments of the present disclosure are contemplated for use in any engine wherein an apparatus and method for removing at least one of particles, objects, foreign objects and combinations thereof would be desired. Non-limiting examples of such engines include but not limited to the following: turbofan engines, turbojet engines, turboshaft, afterburning turbojet engines, ramjet engines as well as any other equivalent engine wherein the apparatus and methods for removing particles from a fluid stream may be employed according to various embodiments of the present disclosure. Still further, various embodiments of the present disclosure are contemplated for use in any engine that may be suitable for use in an aircraft wherein an apparatus and method for removing particles would be desired. The gas turbine engine 10 of FIG. 1 generally has a fan 12 through which ambient air is propelled in the direction of arrow 14 towards an inlet or inlet opening 15 that directs the air towards a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis 22 of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine.

In various non-limiting embodiments of the present disclosure, a particle separator 28 is provided to remove the particles based on their Stokes number for which: there is no external pressure loss (internal pressure loss is at minimum); there is no external power input; and the device or particle separator is compactly designed such that it is conveniently located at stage within gas turbine engine to not sacrifice efficiency and performance of the engine.

Figure 2:
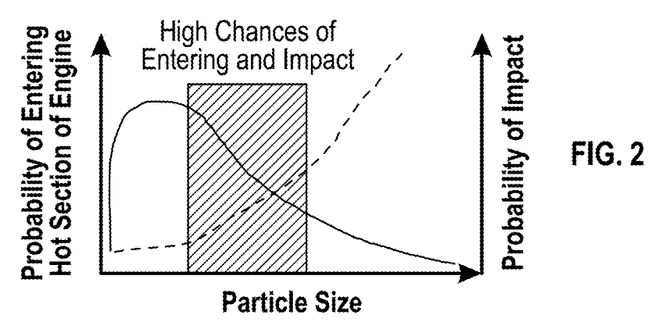
FIG. 2 is a graph illustrating the probability distribution function for particles of a given size entering a hot section of an engine and impacting portions of the engine.

FIG. 2 illustrates a distribution associated with particle size entering the gas path. In accordance with a non-limiting example, the probability distribution function for particle sizes entering an engine is illustrated in the shaded area of the graph of FIG. 2. As can be seen, the probability of particles entering the gas path for particles larger than 20 μm rapidly reduces. FIG. 2 also shows that the probability of particle impact rapidly reduces as the particle size decreases. Therefore, particles with a size ranging from 5-20 μm have both a high chance of entering the gas path as well as having enough mass to potentially cause erosion.

The motion of particles through the gas can be predicted through calculation of a Stoke's number for the particle. The Stokes number is defined as the ratio of the characteristic time of a particle to a characteristic time of the flow. In various non-limiting embodiments of the disclosure, calculation of a Stoke's number for a distribution of particle size are considered in order to configure the particle separator 28 for removing particulate matter from the air.

Although, the particle separator 28 is illustrated for use in an engine it is, of course, understood that the particle separator 28 can also be used for other similar applications where removal of particulate matter from a gas is desired.

Figure 3:
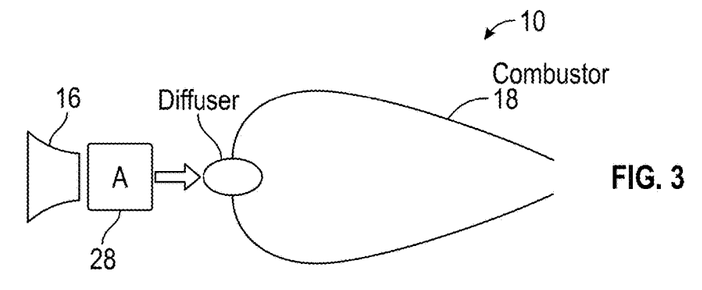
FIG. 3 is a schematic illustration of a particle separator according to one non-limiting embodiment of the disclosure.
Figures 4, 4A, 4B, 4C, 4D:
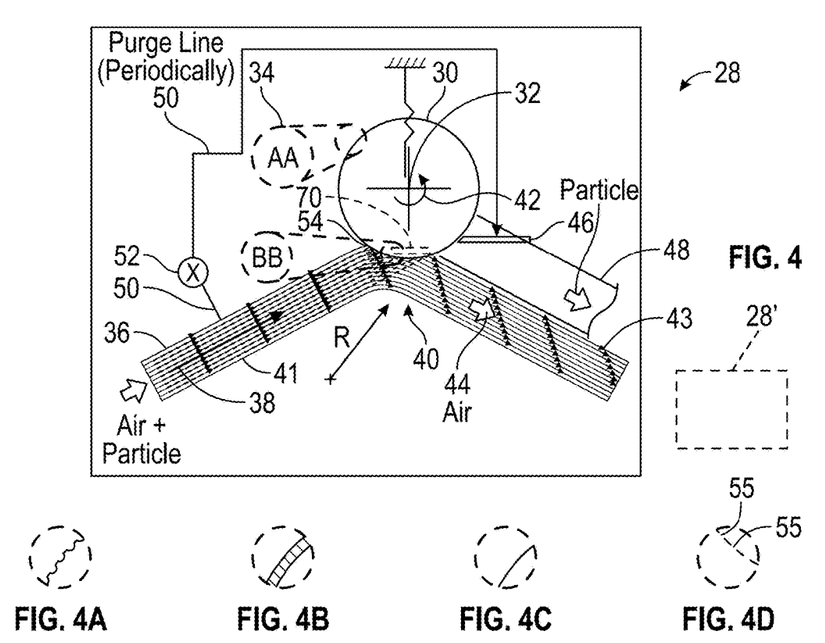
FIG. 4 illustrates components of a particle separator according to various embodiments of the disclosure.
FIG. 4A is an enlarged view of section AA of FIG. 4 according to one non-limiting embodiment of the disclosure.
FIG. 4B is an enlarged view of section AA of FIG. 4 according to another non-limiting embodiment of the disclosure.
FIG. 4C is an enlarged view of section AA of FIG. 4 according to yet another non-limiting embodiment of the disclosure.
FIG. 4D is an enlarged view of section BB of FIG. 4 according to another non-limiting embodiment of the disclosure.
Figure 5A:
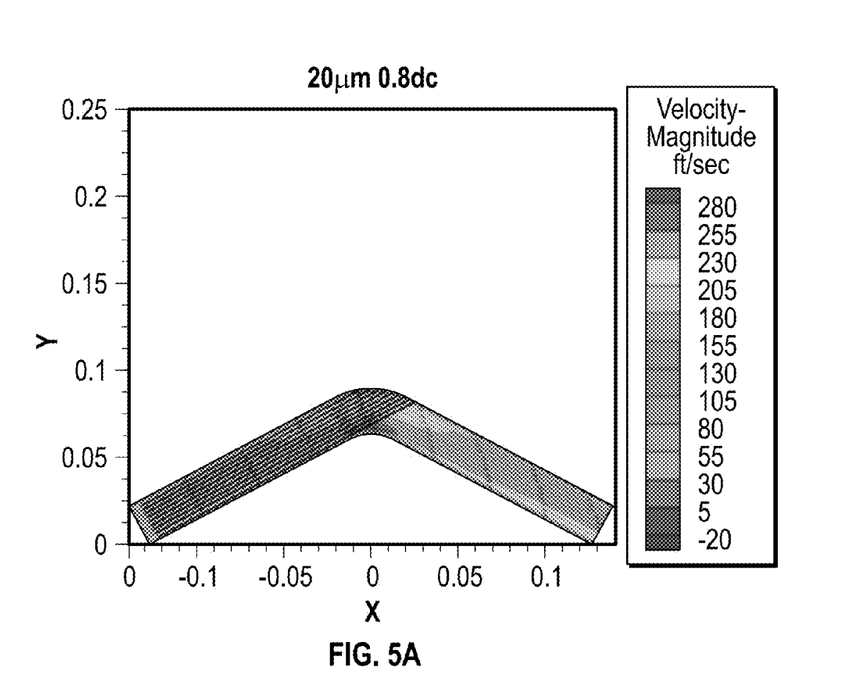
FIGS. 5A-5D are graphs illustrating non-limiting particle path predictions for various particle sizes.
Figure 5B:
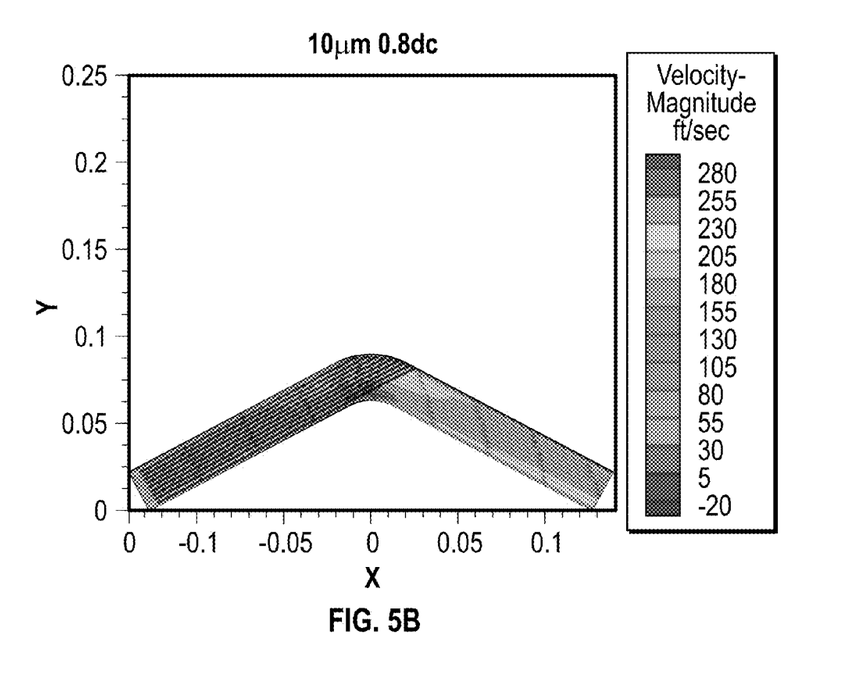
Figure 5C:
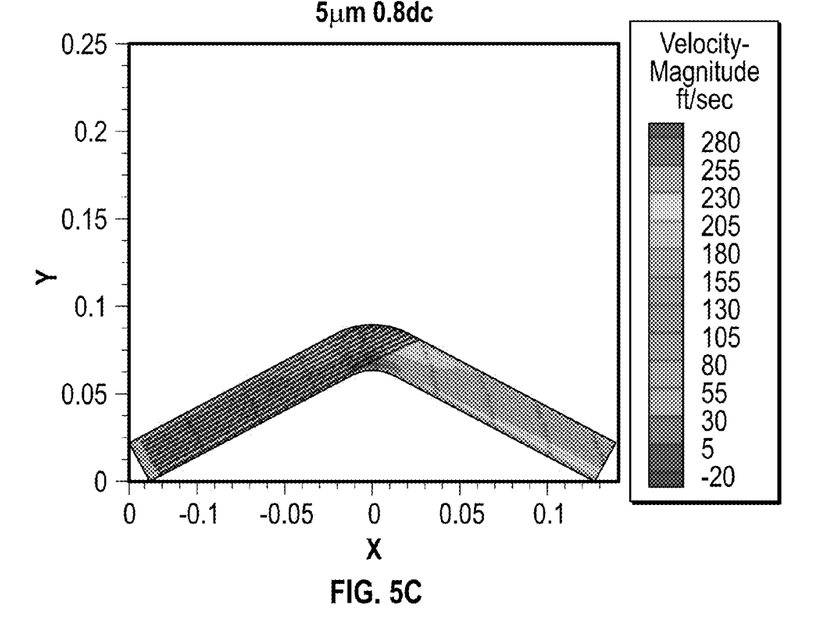
Figure 5D:
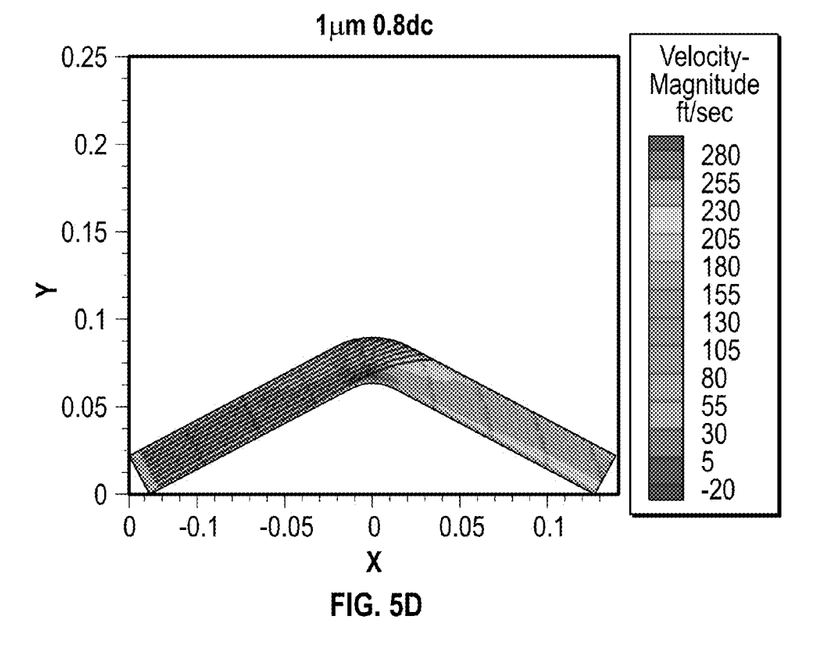

Referring now to FIGS. 3 and 4, the particle separator 28 is located in the engine 10 such that air flow received from the compressor 16, which in one embodiment may be the high pressure stage of the compressor 16, will pass by the particle separator 28 prior to it being introduced into the combustor 18 of the engine. The particle separator 28 is represented schematically as box "A" in FIG. 3.

As illustrated in FIG. 3, the particle separator 28 has a drum 30 rotatably mounted to the engine 10 for movement about an axis 32. In one embodiment, the surface of the drum may be provided with a plurality of grooves 34 or other surface textures. The rotatable drum 30 is positioned to be in fluid communication with a conduit or passage 36 that defines a flow path in the direction of arrow 38. The conduit or passage 36 is configured to have a curved section 40 located between an inlet section or first section 41 and an outlet section or second section 43 such that both the air and the particles entrained in the air are accelerated by making them go over a turn located proximate to section 40, which in one embodiment is defined by radius "R". Since the particles are heavier than the air they travelling in they will continue to travel in the direction of arrow 38 as opposed to following curved section 40 and travelling in the direction of arrow 44 and thus hitting the surface of the drum 30, which in turn causes it turn in the direction illustrated by arrow 42. In an alternative embodiment, the drum 30 may be fixedly secured to the particle separator wherein the particles are captured on a surface of the drum in fluid communication with the conduit or passage 36. As such, the air passing through the curved section 40, as illustrated by arrow 44 will have particles separated therefrom. It being understood that in some embodiments, a portion of the air flowing in the direction of arrow 38 may also contact the surface of the drum 30, which may also cause and/or assist in the rotation of the drum 30 in the direction of arrow 42.

In one embodiment and as mentioned above, the surface of the drum may be provided with a plurality of grooves 34 or textures in order to provide a plurality of features or valleys for capturing the particles as they impact the surface of the drum (See at least FIG. 4A). In addition and as an alternative, the surface of the drum and/or the grooves may be coated with a material that provides a higher coefficient of friction with respect to the particles and the surface of the drum 30 in order for the particles to be captured by the surface of the drum. In one embodiment, the surface of the drum 30 may be only coated with a coating (See at least FIG. 4B, which is an enlarged view of section AA of FIG. 4) as opposed to having a plurality of grooves or alternatively the grooves 34 may also be coated and/or uncoated. Still further and in yet another embodiment, the surface of the drum may have a catalyst or substance located thereon, that is configured to capture, bond or secure the particles thereto by a chemical reaction between the catalyst and the particles (See at least FIG. 4B, which is an enlarged view of section AA of FIG. 4). For example and in one non-limiting embodiment, the catalyst is configured to chemically bond with particles having calcium, magnesium, alumina and silica as well as any of the aforementioned particles further including iron and/or titanium. Still further it may be desirable to capture particles having sodium sulfate, magnesium sulfate and potassium sulfate.

In yet another embodiment and as a standalone feature or in combination with any of the embodiments disclosed herein the surface of the drum may be configured to have an adhesive in order to capture, captivate, bond or secure the particles thereto as they make contact with the surface of the drum (See at least FIG. 4B, which is an enlarged view of section AA of FIG. 4). In yet another embodiment, the surface of the drum may be provided with a solvent layer that dissolves or neutralizes particles that contact the surface of the drum (See at least FIG. 4B, which is an enlarged view of section AA of FIG. 4). Although numerous embodiments are disclosed herein it is, of course, understood that various embodiments contemplate anyone of the embodiments or configurations exclusively or in any combination with any of the embodiments disclosed herein.

In yet another embodiment and depending on the surface configuration of the drums, the particle separator 28 may be configured to have a scraper 46 that is configured and positioned to contact the surface of drum 30 as it rotates in the direction of arrow 42. The scraper 46 is configured to separate the captured particles from the surface of the drum 30. Once released, the captured particles are then directed into a conduit or second conduit 48 fluidly coupled to the surface of the drum.

The particle separator may also have a purge line 50 that is fluidly coupled to conduit 36 and conduit 48 via a valve 52 such that conduit 48 may be periodically purged via actuation of valve 52 in order to have captured particles removed therefrom. In one embodiment, the valve 52 may be an electronically controlled valve.

In order to allow for the particles to impact drum 30, the conduit 36 may have an opening or plurality of openings 54 in order to allow for the particles to separate from the air and continue to travel in the direction of arrow 38 as opposed to following curved section 40 and travelling in the direction of arrow 44 and thus the particles will hit the surface of the drum 30, which in one non-limiting embodiment may cause it turn in the direction illustrated by arrow 42.

In yet another embodiment, the drum 30 may be a perforated hollow drum with a plurality of openings 55 (See at least FIG. 4D, which is an enlarged view of section BB of FIG. 4) located proximate to curved section 40 such that the particles travelling in the direction of arrow 38 travel through openings 54 in the conduit and are captured inside of the drum 30. In this embodiment, the drum 30 may be equipped with a purge gate 70 located at the bottom dead center (BDC) of the drum 30 that is opened or activated during engine shut down so that the collected particles may be released. In addition and in this embodiment, the upper portion of the drum section AA may have a smooth exterior configuration as illustrated in FIG. 4C, which is an enlarged view of section AA of FIG. 4

In an alternative embodiment, the engine 10 may have a plurality of particle separators 28 located in various locations of the engine. In this embodiment, the plurality of particle separators 28 may be collectively referred to as a particle separation system. Still further and in yet another embodiment, the plurality of particle separators 28 may be connected in series wherein the output section or second section 43 of the conduit or passage 36 becomes or is fluidly coupled to the inlet section or first section 41 of conduit 36 of a subsequent particle separator 28' (illustrated schematically by dashed lines in FIG. 4). In this embodiment, each subsequent particle separator 28' may be configured to capture particles of a different and perhaps smaller size by varying the radius of the curved section 40 as well as the surface of the drum 30.

For example, FIGS. 5A-5D are graphs illustrating the particle paths in the conduit or passage 36 based upon a Stokes number calculation for different particle sizes and based upon a 0.8 drag coefficient of the particles and wherein the x and y coordinates are normalized dimensions. Accordingly, the information may be used when configuring the particle separator(s) 28 to capture particles in a desired range of particle size (e.g., 1-20 µm). In yet another embodiment, the particle separator may be configured to captured particles in a desired particle range size that is defined by the range of 1-200 µm. Of course, numerous ranges of particle and/or object sizes greater or less than the aforementioned ranges may be contemplated in accordance with various embodiments of the present disclosure. Through the use of a Stokes number calculation it can be determined that a particle of a specific size or within a defined range will hit a specific location and thus that is where the drum 30 of the particle separator 28 would be located.

Of course, various embodiments of the disclosure are contemplated for use in capturing particles and/or objects having dimensions outside the aforementioned ranges and/or located within smaller nested ranges that may be within the aforementioned ranges or have a portion of the smaller range within the aforementioned ranges.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A particle separator for removing particles in a flow of air, comprising:
   a conduit comprising an inlet section for directing air towards a curved section of the conduit and an outlet section; and
   a drum rotatably mounted for rotation about an axis, wherein the axis extends transverse to the direction of air in the conduit, the drum having a surface in fluid communication with the conduit at the curved section of the conduit, wherein particles in the air travelling into the curved section will contact the surface of the drum and cause it to rotate about the axis, wherein the curved section is located between the inlet section and the outlet section of the conduit, wherein the inlet section, the curved section, and the outlet section form a convex shape relative to the axis, and wherein the particle separator is located in a gas turbine engine configured for use in an aircraft.

2. The particle separator of claim 1, wherein the surface of the drum is provided with a plurality of grooves.

3. The particle separator of claim 1, wherein the surface of the drum is provided with an adhesive layer to captivate the particles that contact the surface of the drum.

4. The particle separator of claim 1, wherein the surface of the drum is provided with a solvent layer that dissolves the particles that contact the surface of the drum.

5. The particle separator of claim 1, wherein the particle separator further comprises a scraper configured and positioned to contact the surface of the drum as it rotates, wherein the scraper is configured to separate particles captured on the surface of the drum from the surface of the drum.

6. The particle separator of claim 5, wherein the conduit is a first conduit and the particle separator further comprises a second conduit fluidly coupled to the surface of the drum, wherein the particles separated from the surface of the drum by the scraper are deposited into the second conduit.

7. The particle separator of claim 6, further comprising a purge line fluidly coupled to the first conduit and the second conduit via a valve, wherein the second conduit is periodically purged via actuation of the valve.

8. The particle separator as in claim 7, wherein the valve is an electronically controlled valve.

9. The particle separator as in claim 1, wherein the conduit has at least one opening providing fluid communication between the surface of the drum and the conduit.

10. A particle separation system comprising:
    a first particle separator for removing particles in a flow of air, comprising:
       a conduit comprising an inlet section for directing air towards a curved section of the conduit and an outlet section; and
       a drum rotatably mounted for rotation about an axis, wherein the axis extends transverse to the direction of air in the conduit, the drum having a surface in fluid communication with the conduit at the curved section of the conduit, wherein particles in the air travelling into the curved section will contact the surface of the drum and cause it to rotate about the axis, wherein the curved section is located between the inlet section and the outlet section of the conduit, wherein the inlet section, the curved section, and the outlet section form a convex shape relative to the axis, and wherein the first particle separator is located in a gas turbine engine configured for use in an aircraft;
    a second particle separator fluidly coupled to the outlet section of the first particle separator, wherein the second particle separator comprises a conduit for directing air towards a curved section of the conduit of the second particle separator; and the second particle separator comprises a drum in fluid communication with the conduit of the second particle separator proximate to the curved section of the conduit of the second particle separator, wherein particles in the air travelling into the curved section of the second particle separator will contact a surface of the drum of the second particle separator.

11. The particle separator of claim 1, wherein the particle separator is configured to direct particles in a range of 1-100 pm into the curved section such that the particles will contact the surface of the drum.

12. The particle separation system of claim 10, wherein the surface of the drum of the first particle separator is provided with a plurality of grooves and the drum of the second particle separator is rotatably secured to the second particle separator.

13. A gas turbine engine, comprising:
    an inlet opening for directing air towards a compressor of the engine; and
    a particle separator located between the compressor and a combustor of the engine such that air travelling towards the combustor from the compressor travels through the particle separator, wherein the particle separator comprises:
       a conduit for directing air towards a curved section of the conduit, wherein the curved section is located between an inlet section and an outlet section of the conduit; and
       a drum rotatably mounted for rotation about an axis, wherein the axis extends transverse to the direction of air in the conduit, the drum having a surface in fluid communication with the conduit at the curved section of the conduit, wherein particles in the air travelling into the curved section will contact the surface of the drum and cause it to rotate about the axis, wherein the inlet section, the curved section, and the outlet section form a convex shape relative to the axis, wherein the gas turbine engine is configured for use in an aircraft.

14. The engine of claim 13, wherein the particle separator further comprises a scraper configured and positioned to contact the surface of the drum as it rotates, wherein the scraper is configured to separate particles captured on the surface of the drum from the surface of the drum.

15. The engine of claim 13, wherein the particle separator is configured to direct particles in a range of 1-200 pm into the curved section such that the particles will contact the surface of the rotatable drum.

16. A method for removing particles from an air flow path, comprising:
   directing air from an inlet section of a conduit of a gas turbine engine configured for use in an aircraft towards a curved section of the conduit, wherein the curved section is located between an inlet section and an outlet section of the conduit;
   accelerating a velocity of particles in the air at the curved section; and
   receiving and retaining the particles on a surface of a drum at the curved section, wherein the particles in the air cause the drum to rotate about an axis, wherein the axis extends transverse to the direction of air in the conduit, and wherein the inlet section, the curved section, and the outlet section form a convex shape relative to the axis.

* * * * *